(12) United States Patent
Hatori et al.

(10) Patent No.: US 8,072,733 B2
(45) Date of Patent: Dec. 6, 2011

(54) ELECTROCHEMICAL CAPACITOR AND ELECTRODE MATERIAL FOR USE THEREIN

(75) Inventors: Hiroaki Hatori, Ibaraki (JP); Osamu Tanaike, Ibaraki (JP); Kenji Hata, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 119 days.

(21) Appl. No.: 11/990,600

(22) PCT Filed: Aug. 17, 2006

(86) PCT No.: PCT/JP2006/316137
§ 371 (c)(1),
(2), (4) Date: Feb. 19, 2008

(87) PCT Pub. No.: WO2007/020959
PCT Pub. Date: Feb. 22, 2007

(65) Prior Publication Data
US 2009/0122469 A1    May 14, 2009

(30) Foreign Application Priority Data

Aug. 19, 2005 (JP) ................................ 2005-239209
Aug. 11, 2006 (JP) ................................ 2006-219509

(51) Int. Cl.
*H01G 9/00* (2006.01)
(52) U.S. Cl. ..................................................... 361/502
(58) Field of Classification Search .................. 361/502
See application file for complete search history.

(56) References Cited

U.S. PATENT DOCUMENTS

| 6,773,466 | B1 * | 8/2004 | Hiratsuka et al. ............ 29/25.03 |
| 7,118,881 | B2 * | 10/2006 | Lee et al. ........................ 435/14 |
| 7,387,735 | B2 * | 6/2008 | Park et al. ...................... 210/651 |
| 7,440,257 | B2 * | 10/2008 | Kirchner et al. ............... 361/502 |
| 7,854,991 | B2 * | 12/2010 | Hata et al. ...................... 428/408 |
| 2003/0205457 | A1 * | 11/2003 | Choi et al. ..................... 204/164 |
| 2007/0153362 | A1 * | 7/2007 | Gruner ........................... 359/315 |
| 2007/0258192 | A1 * | 11/2007 | Schindall et al. .............. 361/503 |

FOREIGN PATENT DOCUMENTS

JP          09-045312        2/1997
(Continued)

OTHER PUBLICATIONS

Kenij Hata et al., "Water-Assisted Highly Efficient Synthesis of Impurity-Free Single-Walled Carbon Nanotubes", Science, vol. 306, Nov. 19, 2004, pp. 1362-1364.

(Continued)

*Primary Examiner* — Eric Thomas
*Assistant Examiner* — David M Sinclair
(74) *Attorney, Agent, or Firm* — Wenderoth, Lind & Ponack, L.L.P.

(57) ABSTRACT

An electrochemical capacitor comprising a nonaqueous electrolyte and a pair of polarizable electrodes, wherein carbon nanotubes are used as an electrode material for at least one of the positive electrode and the negative electrode, the carbon nanotubes have a specific surface area of at least 700 m$^2$/g and contain semiconductive carbon nanotubes, and the electrode material exhibits a voltage dependency of differential capacity by electrochemical doping. The electrochemical capacitor solves the problems associated with activated carbon electrodes and, exploiting the excellent characteristics of carbon nanotubes, has increased capacitance and increased energy density, therefore realizing a reduced internal resistance and a prolonged service life.

4 Claims, 5 Drawing Sheets

FOREIGN PATENT DOCUMENTS

| | | |
|---|---|---|
| JP | 2000-340469 | 12/2000 |
| JP | 2001-307951 | 11/2001 |
| JP | 2002-362912 | 12/2002 |
| JP | 2003-234254 | 8/2003 |
| JP | 2004-002409 | 1/2004 |
| JP | 2005-046669 | 2/2005 |
| JP | 2005-353758 | 12/2005 |
| WO | WO 2006011655 A1 * | 2/2006 |

OTHER PUBLICATIONS

Shigeo Maruyama et al., "Growth Process of Vertically Aligned Single-Walled Carbon Nanotubes", Chemical Physics Letters, 403, Jan. 2005, pp. 320-323.

Yutaka Maeda et al., "Dispersion of Single-Walled Carbon Nanotube Bundles in Nonaqueous Solution", Journal of Physical Chemistry B, 108, Nov. 6, 2004, pp. 18395-18397.

International Search Report mailed Sep. 19, 2006 for International Application No. PCT/JP2006/316137.

Written Opinion of the International Searching Authority mailed Sep. 19, 2006 for International Application No. PCT/JP2006/316137.

* cited by examiner

ELECTROCHEMICAL CAPACITOR AND ELECTRODE MATERIAL FOR USE THEREIN

TECHNICAL FIELD

The present invention relates to an electrochemical capacitor having high electric capacity and high energy density and having an increased withstand voltage, and to an electrode material for use therein.

BACKGROUND ART

Heretofore, electric double-layer capacitors are known, and electric double-layer capacitors of small capacity are used for memory backup powers for personal computers, for assistance for secondary batteries, etc. The electric double-layer capacitor comprises a pair or polarizable electrodes as combined via a separator such as paper or nonwoven fabric put between them to constitute a device, and this serves as an accumulator that produces a small-level electric double-layer capacity to be generated by dipping the device in an electrolyte solution and applying a voltage thereto.

The electric capacity of the electric double-layer capacitor depends on the surface area of the electrode therein, and accordingly, heretofore, the mainstream of the material for the polarizable electrode is activated carbon having a large specific surface area. However, the electric double-layer capacity per the specific surface area of activated carbon is limited, and this is the main reason for the small energy density of the capacitor that comprises activated carbon. In activated carbon having a large surface area, there exist a large amount of graphene sheet edges that cause decomposition of electrolyte solution, and the withstand voltage (charge-discharge voltage) of the capacitor that comprises the activated carbon of the type is generally limited to about 2.5 V.

Accordingly, the withstand voltage of the electric double-layer capacitor comprising an activated carbon electrode is increased up to about 3.3 V according to a special method of, for example, high-temperature hydrogen treatment of electrode material (Patent Documents 1, 2).

However, even the electric double-layer capacitor that comprises such a specifically-processed activated carbon electrode is faced with a problem of capacitance reduction of about 20% in 1000 cycles of charge-discharge repetition at 3.3 V, and it is extremely difficult to attain an excellent cycle characteristic of over 100,000 cycles that is a specific performance of electric double-layer capacitors. In addition, since the activated carbon electrode has a large internal resistance, and the problem must be solved for further capacity increase.

In that situation, carbon nanotubes have high electroconductivity because of their structure, and have a small internal resistance, and therefore, their use for electrodes for electric double-layer capacitors is under investigation, and for example, in Patent Document 3, proposed is a technique of using brush-shaped carbon nanotubes as electrodes of electric double-layer capacitors.

However, conventional carbon nanotubes used as electrodes in electric double-layer capacitors have a bundle structure of such that a few hundreds of tubes are bundled together by van der Waals force, and are therefore problematic in that the carbon surfaces, which are the sites to adsorb electrolyte ions in an electric double-layer capacitor and to determine the electric capacity thereof, are hardly exposed out owing to the bundle formation by the fibers bonding together. Accordingly, the effective specific surface area for electric double-layer formation is small, and the specific surface area obtained according to a nitrogen adsorption method (hereinafter this may be simply referred to "specific surface area") is a few hundreds $m^2/g$ or so. It may be taken into consideration to open the tubes by oxidation treatment or the like to thereby increase the specific surface area, but even in such a case, the specific surface area obtained by a nitrogen adsorption method could be increased up to about 500 $m^2/g$.

In future, use of electric double-layer capacitors is expected in a broad range, for example, for warming up powers for fuel cell automobiles, regenerating powers for hybrid automobiles, powers for heavy industrial machines and robots, etc. For this, further expected are realizations of higher capacitance, higher withstand voltage and more prolonged service life of electric double-layer capacitors.

Patent Document 1: JP-A 2002-362912
Patent Document 2: JP-A 2000-340469
Patent Document 3: JP-A 2003-234254
Non-Patent Document 1: Science, Vol. 306, pp. 1362-1364 (2004)
Non-Patent Document 2: Chemical Physics Letters, 403, pp. 320-323 (2005)
Non-Patent Document 3: Journal of Physical Chemistry B2004, 108, pp.

SUMMARY OF THE INVENTION

Problems that the Invention is to Solve

The present invention has been made in consideration of the situation of such prior arts, and its object is to provide an electrochemical capacitor that solves the problems with activated carbon electrodes and, exploiting the excellent characteristics of carbon nanotubes, has further increased capacitance and increased energy density, therefore realizing an improved withstand voltage and a prolonged service life, and to provide an electrode material for use therein.

In the specification of this application, capacitors including electric double-layer capacitors and others having various accumulation mechanisms such as redox capacitors with redox (reduction-oxidation) reaction are referred to as a generic term of "electrochemical capacitors".

Means for Solving the Problems

The inventors of this application have made assiduous studies for solving the above-mentioned problems and, as a result, have found that carbon nanotubes are grouped into metallic (electroconductive) ones and semiconductive ones, and that, when those including the semiconductive carbon nanotubes are used as an electrode material for an electrochemical capacitor, then the semiconductive carbon nanotubes undergo electrochemical doping (p-dope and n-dope) when polarized while kept in contact with an electrolyte solution, thereby increasing a carrier density to exhibit the same behavior as that of an intrinsic semiconductor such as silicon or germanium, and thereby increasing the electric capacity, and have completed the present invention.

Specifically, this application is, for solving the above-mentioned problems, to provide first an electrochemical capacitor comprising a nonaqueous electrolyte and a pair of electrodes, in which carbon nanotubes are used as an electrode material for at least one of the positive electrode and the negative electrode, the carbon nanotubes have a specific surface area of at least 700 $m^2/g$ and contain semiconductive carbon nanotubes, and the electrode material exhibits a potential dependency of differential capacity by electrochemical doping.

Secondly, there is provided an electrochemical capacitor of the above first invention, wherein the differential capacity ratio of the electrode material, $C_{0.5}/C_0$ (where $C_0$ is a differential capacity (F/g) per the electrode weight at a zero charge potential $E_0$; $C_{0.5}$ is a differential capacity (F/g) per the electrode weight at a potential polarized by 0.5 V from the zero charge potential) is at least 1.2.

Thirdly, there is provided an electrochemical capacitor of the above first or second invention, wherein the specific surface area of the carbon nanotubes in the electrode material is from 700 to 2500 $m^2/g$.

Fourthly, there is provided an electrochemical capacitor of any of the above first to third inventions, wherein the differential capacity ratio of the electrode material, $C_{0.5}/C_0$ is at least 1.8.

Fifthly, there is provided an electrode material for electrochemical capacitors, which comprises carbon nanotubes having a specific surface area of at least 700 $m^2/g$ and contains semiconductive carbon nanotubes, and which exhibits a potential dependency of differential capacity by electrochemical doping.

Sixthly, there is provided an electrode material for electrochemical capacitors of the above fifth invention, which comprises carbon nanotubes having a specific surface area of at least 700 $m^2/g$ and contains semiconductive carbon nanotubes, and which has a differential capacity ratio, $C_{0.5}/C_0$ (where $C_0$ is a differential capacity (F/g) per the electrode weight at a zero charge potential $E_0$; $C_{0.5}$ is a differential capacity (F/g) per the electrode weight at a potential polarized by 0.5 V from the zero charge potential) of at least 1.2.

Seventhly, there is provided an electrode material for electrochemical capacitors of the above fifth or sixth invention, wherein the specific surface area of the carbon nanotubes is from 700 to 2500 $m^2/g$.

Eighthly, there is provided an electrode material for electrochemical capacitors of any of the above fifth to seventh inventions, which has a differential capacity ratio, $C_{0.5}/C_0$ of at least 1.8.

EFFECT OF THE INVENTION

The present invention makes it possible to provide an electrochemical capacitor which comprises an electrode material having a large specific surface area and containing semiconductive carbon nanotubes, which solves the problems with activated carbon electrodes by utilizing an accumulative effect by a novel mechanism heretofore unknown in the art, and, exploiting the excellent characteristics of carbon nanotubes, has further increased capacitance and increased energy density, therefore realizing an improved withstand voltage and a prolonged service life, and to provide an electrode material for use therein.

DESCRIPTION OF REFERENCE NUMERALS

1 Electrode
2 Separator
3 Collector

DETAILED DESCRIPTION OF THE INVENTION

The present invention has the above-mentioned characteristics, and its embodiments are described below.

The electrochemical capacitor of the present invention comprises a nonaqueous electrolyte and a pair of electrodes, in which carbon nanotubes are used as an electrode material for at least one of the positive electrode and the negative electrode, the carbon nanotubes have a specific surface area of at least 700 $m^2/g$ and contain semiconductive carbon nanotubes, and the electrode material exhibits a potential dependency of differential capacity by electrochemical doping.

Figure 1:
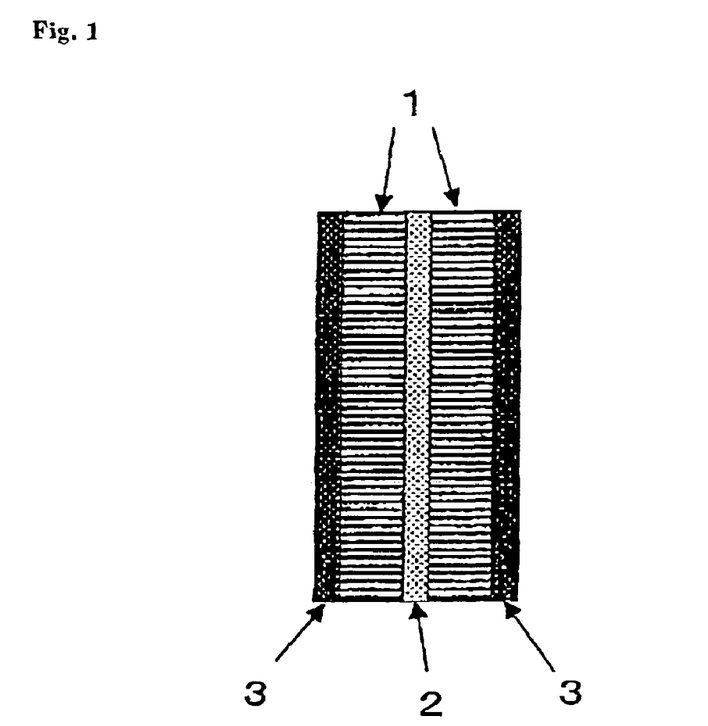
FIG. 1 is a cross-sectional view schematically showing the constitution of an electrochemical capacitor of the present invention.

FIG. 1 is a cross-sectional view schematically showing the constitution of an electrochemical capacitor of the present invention. In the drawing, (1) is a pair of electrodes (positive electrode and negative electrode) comprising carbon nanotubes, and these are made to face each other via a separator (2) put therebetween, and are further sandwiched between a pair of collectors (3), and infiltrated with a nonaqueous electrolyte.

Carbon nanotubes are used for the electrodes (1), and the specific surface area of the carbon nanotubes, as measured according to a nitrogen adsorption method, is preferably as large as possible, more preferably at least 700 $m^2/g$, even more preferably at least 1000 $m^2/g$, still more preferably at least 1500 $m^2/g$, and its uppermost limit is 2500 $m^2/g$ or so. Such a large specific surface area is desirable as more increasing the capacitance of the electrochemical capacitor and more increasing the energy density thereof. The carbon nanotubes may be single-walled ones or may be double-walled, triple-walled or more multi-walled ones, or may be their mixtures.

Heretofore, the specific surface area of the carbon nanotubes used for electrodes of electrochemical capacitors is at most 500 $m^2/g$ or so. The electrochemical capacitor of the present invention comprises carbon nanotubes having an extremely large specific surface area of at least 700 m²/g, for attaining the intended object. Such a large specific surface area of carbon nanotubes may be attained by using carbon nanotubes not forming a bundle, or by selectively using carbon nanotubes having formed few bundles. In this case, the carbon nanotubes with no or little bundle formation can be obtained according to the method described in Hata, one inventor of the present application, et al's Science, Vol. 306, pp. 1362-1364 (2004) (Non-Patent Document 1) or in Maruyama et al's Chemical Physics Letters 403, pp. 320-323 (2005) (Non-Patent Document 2). In addition, a commercial product, HiPco (by Carbon Nanotechnologies) having a specific surface area of a few hundreds m²/g or so may be processed for bundle structure cleavage, for example, as in a Maeda et al's report, Journal of Physical Chemistry B2004, 108, pp. 18395-18397 (Non-Patent Document 3), thereby obtaining the intended bundle-free carbon nanotubes.

The carbon nanotubes for use in the electrochemical capacitor of the present invention have a large specific surface area as described in the above, and, in addition, they are semiconductive and exhibit a potential dependency of differential capacity by electrochemical doping. It is known that semiconductive carbon nanotubes can be readily obtained, for example, when they are worked to have a reduced tube diameter.

Figure 2:
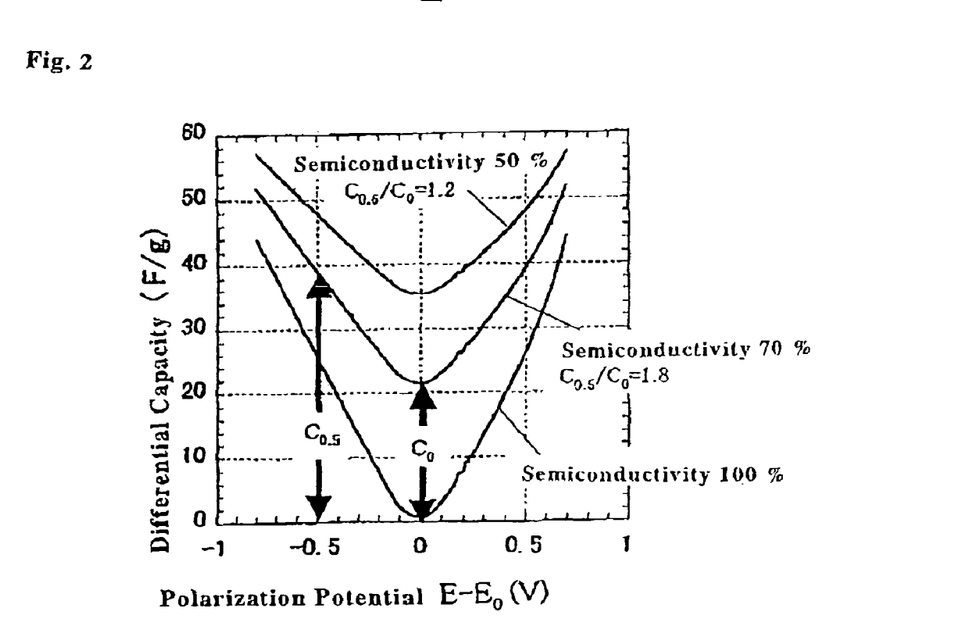
FIG. 2 is a view showing the condition of a potential dependency of the differential capacity of an electrode containing semiconductive carbon nanotubes.
Figure 3:
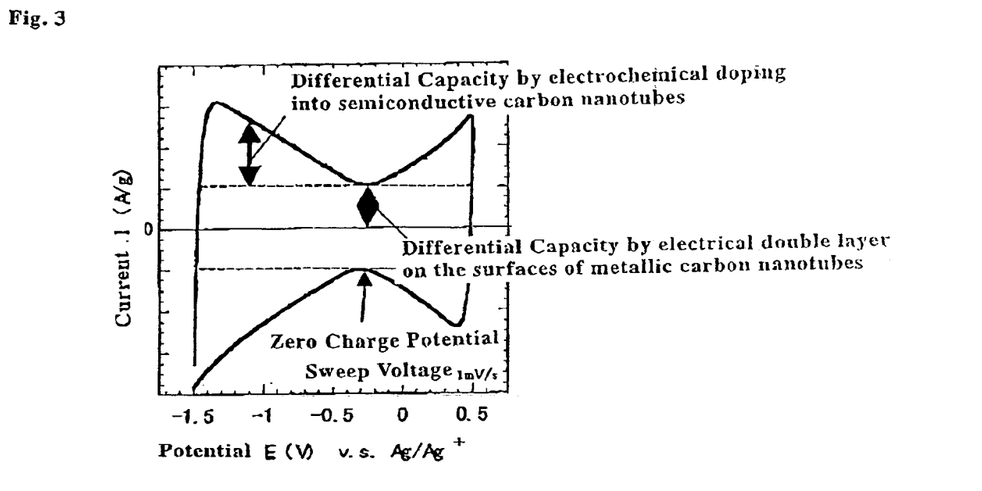
FIG. 3 is a view showing a cyclic voltammogram, as measured using, as a working electrode, an electrode material having a semiconductive carbon nanotube content of 70% by weight and a metallic carbon nanotube content of 30% by weight, and using $Ag/Ag^+$ as a reference electrode.

The relationship between the semiconductivity of carbon nanotubes and the potential dependency of the differential capacity thereof is described with reference to the drawings. As described in the above, when semiconductive carbon nanotubes are polarized while kept in contact with an electrolyte solution, then the carrier density therein may increase by electrochemical doping and an electric current may flow therein. Their behavior is similar to that of intrinsic semiconductors such as silicon and germanium, and the semiconductive carbon nanotubes exhibit a potential-dependent differential capacity as in FIG. 2 (semiconductivity 100%, etc.). FIG. 3 is a view showing a cyclic voltammogram, as measured using, as a working electrode, an electrode material having a semiconductive carbon nanotube content of 70% by weight and a metallic carbon nanotube content of 30% by weight, and using Ag/Ag⁺ as a reference electrode. Since the metallic carbon nanotubes are conductor, they form an electric double-layer in the interfaces thereof that are in contact with an electrolyte solution, and therefore, they have an electric capacity even at a zero charge potential. On the other hand, when the semiconductive carbon nanotubes are subjected to positive/negative polarization at a zero charge potential serving as the center thereof, then the current flow increases symmetrically with the polarized potential. As a result, with the electrode of a mixture of metallic/semiconductive carbon nanotubes used for the data measurement in FIG. 3, the cyclic voltammogram is the sum total of both the current/voltage curves of the two.

The electric double-layer capacity, per the actually-measured surface area, of semiconductive carbon nanotubes is from 1.3 to 2 times higher than that of an ordinary conductor, activated carbon electrode, and the semiconductive carbon nanotubes exhibit extremely excellent properties as an electrode material for electrochemical capacitors. However, the band gap of the semiconductive carbon nanotubes have a variation, and as a practicable material, a mixture of both metallic/semiconductive carbon nanotubes may be used, and therefore, as a substantial parameter of indicating the semiconductivity of the electrochemical capacitor electrode material, a differential capacity ratio $C_{0.5}/C_0$ as in FIG. 2 is defined for the electrode of a mixture of metallic/semiconductive carbon nanotubes, in the specification. Here, $C_0$ is a differential capacity (F/g) per the electrode weight at a zero charge potential $E_0$, and $C_{0.5}$ is a differential capacity (F/g) per the electrode weight at a potential polarized by 0.5 V from the zero charge potential. The zero charge potential and the differential capacity change, depending on the electrolyte solution and the condition in measurement; and therefore, in the specification, an electrolyte (1 mol/L) solution prepared by dissolving tetraethylammonium tetrafluoroborate (TEABF4) in propylene carbonate (PC), which is most generally used as an electrolyte solution for electrochemical capacitors, is used, and in a three-electrode type cell that comprises a silver/silver ion (Ag/Ag⁺) electrode as a working electrode, the differential capacity is measured between the zero charge potential and a polarized potential at a sweep velocity of 1 mV/s and at a room temperature (20 to 25° C.) within a range of from −1 V to 0.5 V relative to the Ag/Ag⁺ standard, and the value of the thus-measured differential capacity is used herein. The influence of water having mixed in the electrolyte on the data is taken into consideration, and $C_{0.5}$ is the value measured in 0.5 V polarization toward the negative potential direction.

In order that the electrochemical capacitor of the present invention may have a sufficient effect of electric capacity increase, the differential capacity ratio, $C_{0.5}/C_0$ is preferably at least 1.2 (corresponding to the weight ratio of semiconductive carbon nanotubes of at least 50%), more preferably $C_{0.5}/C_0$=at least 1.8 (corresponding to that of at least 80%). Its uppermost limit may be 20 or so. In this connection, the differential capacity ratio in a case of metallic carbon nanotubes alone is 1.

In a conventional activated carbon electrode, in general, there exist a large amount of graphene sheet edges that cause decomposition of electrolyte solution, and the working voltage of the capacitor that comprises a conventional activated carbon electrode is generally limited to 2.5 V or so, however, the carbon nanotubes for use in the electrode of the electrochemical capacitor of the present invention have a large specific surface area even though they are not processed for activation, and have high structure integrity, and therefore it has been confirmed that the capacitor of the invention endures charge/discharge at a withstand voltage of 3.5 V. The electric energy to be accumulated in a capacitor is proportional to the square of voltage, and therefore the capacitor having a high withstand voltage may have an extremely excellent characteristic for the purpose of electric energy storage.

The specific surface area of the entire carbon nanotube electrode used in the embodiment of FIG. 3 is 1000 m²/g, and the electric capacity is 0.018 F/M² when metallic carbon nanotubes alone are used while the electric capacity is 0.025 F/M² when those with semiconductive carbon nanotubes are used (this is a value in polarization by −1.5 V relative to the reference electrode, Ag/Ag+); and this confirms the increase by 40% or so over the case of metallic carbon nanotubes alone.

As the collector in the electrochemical capacitor of the present invention, usable are various materials heretofore used for electrochemical capacitors, for example, metal foil such as silicon, titanium, stainless steel, tantalum, graphite, aluminum, as well as mesh, punching metal, etc.

As the separator, usable are various materials heretofore used for electrochemical capacitors, for example, microporous polypropylene, microporous polytetrafluoroethylene, etc.

The nonaqueous electrolyte for use herein may be any organic electrolyte heretofore generally used for electrochemical capacitors. For example, usable are those prepared by dissolving an organic solute such as tetraethylammonium tetrafluoroborate, tetraethylammonium hexafluorophosphate or tetrabutylammonium perchlorate, or an inorganic solute comprising a cation such as lithium or quaternary phosphonium and an anion such as $BF_4^-$, $PF_6^-$, $ClO_4^-$ or $CF_2SO_2^-$, in an aprotic solvent such as propylene carbonate, 1-butylene carbonate, sulfolane, acetonitrile, γ-butyrolactone or dimethylformamide.

In the present invention, also usable are those prepared by exposing the oriented carbon nanotube bulk aggregate that had been produced according to the method proposed in the above-mentioned Non-Patent Document 1, to a liquid followed by drying it to thereby make it have an increased density. In this, the adjacent carbon nanotubes firmly bond to each other by the van der Waals force therebetween, and in addition, these carbon nanotubes are oriented in a predetermined direction, and the density thereof per the unit volume of the electrode material is preferably from 0.2 to 1.0 g/cm³, more preferably from 0.5 to 0.9 g/cm³, even more preferably from 0.6 to 0.7 g/cm³. The oriented carbon nanotube bulk aggregate having such a high density may have an apparent morphology like "solid".

The liquid to which the aggregate of plural oriented carbon nanotube bulks is exposed is preferably one having an affinity to carbon nanotubes and not remaining in the carbon nanotubes wetted with it and dried. The liquid includes, for example, water, alcohols (isopropanol, ethanol, methanol), acetones (acetone), hexane, toluene, cyclohexane, DMF (dimethylformamide).

The method of exposing the plural oriented carbon nanotubes to the above liquid includes, for example, a method comprising applying the liquid drops little by little onto the upper surface of the oriented carbon nanotube bulk aggregate and repeating the operation until the liquid drops could finally completely contain the oriented carbon nanotube bulk aggregate therein; a method comprising wetting the surface of a substrate with the liquid by the use of a pipette or the like, whereby the liquid is infiltrated into the oriented carbon nanotube bulk aggregate from the point at which the aggregate is kept in contact with the substrate, and thus the oriented carbon nanotube bulk aggregate is entirely dipped in the liquid; a method comprising evaporating the liquid and exposing the oriented carbon nanotube bulk aggregate to the vapor either entirely or directionally; a method of spraying the liquid onto the oriented carbon nanotube bulk aggregate. For drying the carbon nanotubes after exposed to the liquid, for example, employable is a method of spontaneously drying them at room temperature, or drying them in vacuum or heating them on a hot plate.

The use of the oriented carbon nanotube bulk aggregate having such an increased high density is advantageous in that the electric capacity of the capacitor may be greatly increased per the unit volume thereof.

Figure 10:
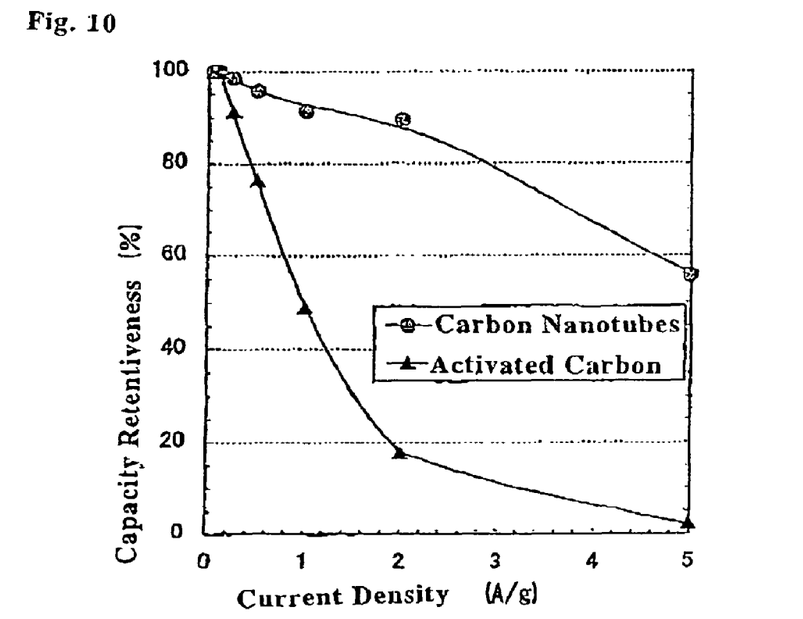
FIG. 10 is a view showing the test result of a capacity retentiveness under a high-speed discharge condition of an electrochemical capacitor of the present invention that comprises an electrode having a thickness of 500 μm, as compared with a comparative capacitor that comprises activated carbon (YP17) having the same thickness as in the former.

Water drops were applied little by little onto the oriented carbon nanotube bulk aggregate used in Example 1 mentioned below, in such a manner that the aggregate could be finally completely dipped in the water drops, and then this was put on a hot plate kept at a temperature of 170° C. and was thus dried thereon. Using the thus-prepared, oriented carbon nanotube bulk aggregate, an electrochemical capacitor was produced (except the density, this was produced under the same condition), and this had an electric capacity of 11 F/cm³ (density, 0.51 g/cm³) per the electrode volume at 2.5 V, and its performance was further more improved. FIG. 10 shows the data of the volume retentiveness under a high-speed discharge condition of the electrochemical capacitor with an electrode having a thickness of 500 μm and formed of the above-mentioned oriented carbon nanotube bulk structure having a density of 0.51 g/cm³ (the test method is the same two-electrode type capacitor cell method (1M TEABF4/PC solution) as in Example 1 mentioned below), as compared with the data of a comparative capacitor comprising an electrode of activated carbon (YP17) having the same thickness. The data in the drawing confirm that the electrochemical capacitor of the present invention that comprises an oriented carbon nanotube bulk structure electrode having a high density keeps a high capacity retentiveness under the high-speed discharge condition even though it is thick. In addition, the use of the electrode material having a high density is advantageous in that it significantly contributes towards the reduction in the volume of capacitor.

EXAMPLES

The present invention will be described in more detail by way of the following Examples. Needless-to-say, those Examples are not intended to restrict the scope of the present invention.

Example 1

Ethylene was used as a carbon compound, and a carbon nanotube sheet was produced according to a CVD method with addition of a very small amount of water vapor. The specific surface area of the carbon nanotubes of the sheet was 1003 m²/g; the ratio by weight of metallic carbon nanotubes/semiconductive carbon nanotubes in the sheet was 30/70; and the differential capacity ratio $C_{0.5}/C_0 = 1.2$.

Two carbon nanotube sheets (10 mm×10 mm×1 mm thickness) produced in the above was put to face each other via a glass filter having a thickness of 100 μm sandwiched therebetween, and this was further sandwiched between two platinum collectors, thereby constructing a two-electrode type capacitor cell having the structure of FIG. 1. Next, in a dry argon atmosphere in a glove box, the cell was put into 1 M TEABF4/PC solution under reduced pressure.

Figure 4:
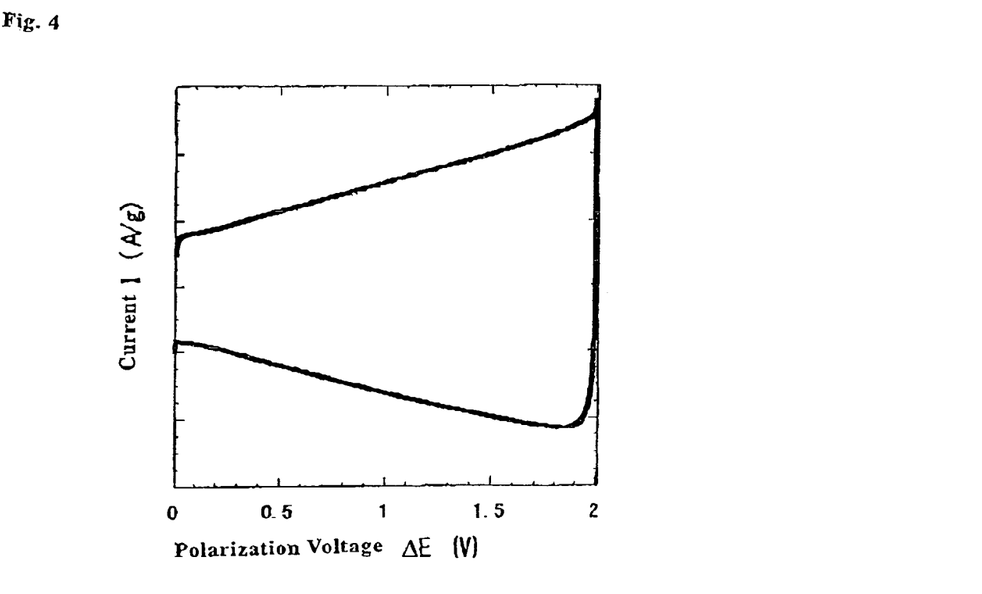
FIG. 4 is a view showing a cyclic voltammogram in a case where the electrochemical capacitor of Example 1 is polarized with a range of from 0 to 2 V.
Figure 5:
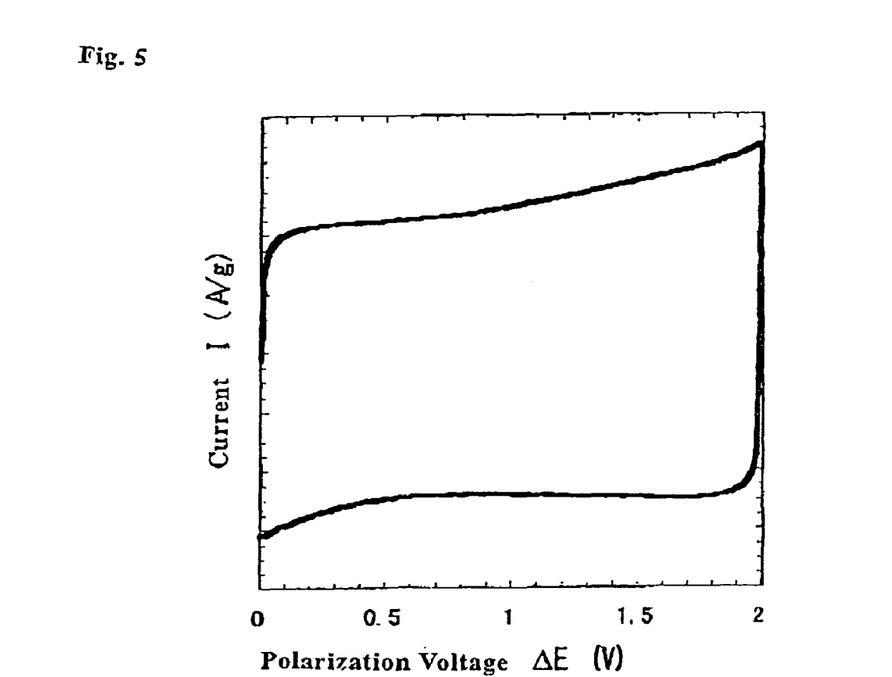
FIG. 5 is a view showing a cyclic voltammogram, as measured with the electrochemical capacitor of Comparative Example 1 using a commercial activated carbon electrode material, in the same manner as in Example 1.

FIG. 4 is a view showing a cyclic voltammogram (CV) in polarization from 0 to 2 V. A capacitor comprising an ordinary activated carbon electrode gives a rectangular CV curve (see FIG. 5 showing the data of Comparative Example 1), but the electrode that comprises semiconductive carbon nanotubes is characterized by giving a trapezoidal CV curve, as being characterized in that the current flow increases with the increase in the polarization voltage.

Figure 6:
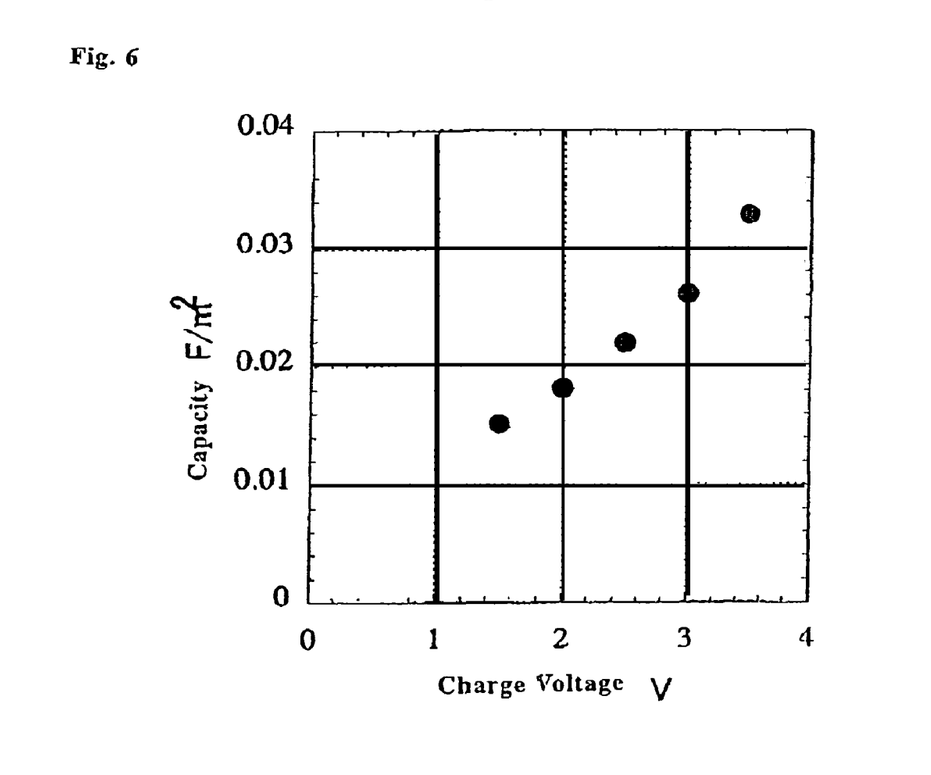
FIG. 6 is a view showing the change of the single electrode capacity relative to the charge voltage, as obtained from the charge-discharge test with the electrochemical capacitor of Example 1.
Figure 8:
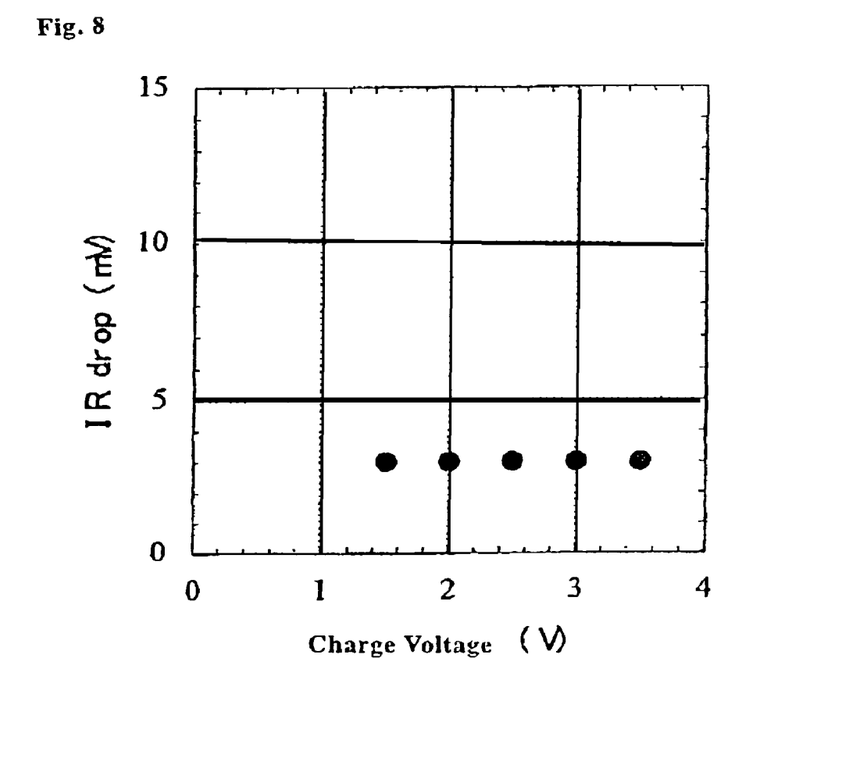
FIG. 8 is a view showing the change of the internal resistance relative to the charge voltage, as obtained from the charge-discharge test with the electrochemical capacitor of Example 1.

The charge-discharge test for determining the electric capacity and the internal resistance of electrode was carried out according to "Standard of Electronic Industries Association of Japan, EIAJ RC-2377". As in FIG. 6, the electric capacity per the single electrode weight increased up to 3.5 V proportionally to the polarization voltage. FIG. 8 is a view showing the change of the internal resistance by the voltage drop (IR drop) at the start of discharging, and this shows no voltage change relative to charging up to 3.5 V, indicating that the carbon nanotube electrode is extremely stable to polarization up to that potential. Based on the above-mentioned specific surface area value, the electric capacity per the unit surface area at a polarization voltage 2.5 V or 3.5 V is computed, and it is 0.022 F/m² and 0.033 F/m², respectively.

Comparative Example 1

Figure 7:
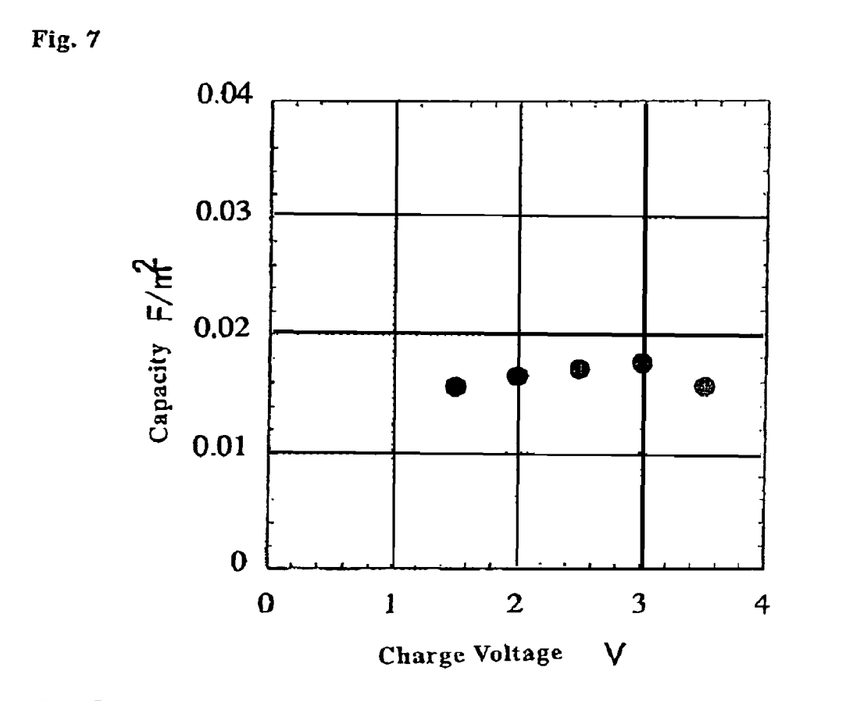
FIG. 7 is a view showing the change of the single electrode capacity relative to the charge voltage, as obtained from the charge-discharge test with the electrochemical capacitor of Comparative Example 1 in the same manner as in Example 1.
Figure 9:
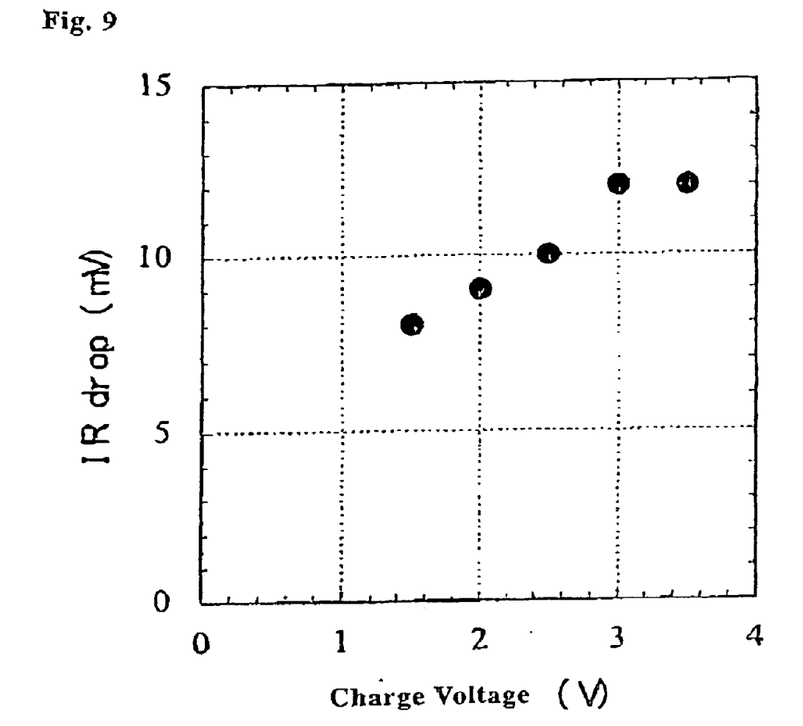
FIG. 9 is a view showing the change of the internal resistance relative to the charge voltage, as obtained from the charge-discharge test with the electrochemical capacitor of Comparative Example 1 in the same manner as in Example 1.

A commercial product, activated carbon for electric double-layer capacitor (Kuraray Chemical's YP-17, having a specific surface area of 1460 m²/g) and a conductivity promoter carbon black were kneaded with a binder polytetrafluoroethylene, and formed into a sheet (thickness, 0.1 mm). Using this as an electrode, a capacitor cell was constructed and evaluated in the same manner as in Example 1. FIG. 5 shows CV in polarization from 0 to 2 V, and this is a rectangular CV curve that is generally given by an ordinary electric double-layer capacitor. As in FIG. 7, the electric capacity per the single electrode weight does not almost depend on the polarization voltage. Up to 3 V, the capacity slightly increased, but in charging at 3.5 V, the capacity greatly decreased. This means that the decomposition of the electrolyte solution and the electrode may somewhat contribute toward the measured electric capacity, and further that, at the polarization voltage 3.5 V, the decomposition reaction was remarkable therefore causing the deterioration of the electrode performance. FIG. 9 shows the change of internal resistance, and the internal resistance remarkably increased relative to the increase in the polarization voltage, therefore explicitly indicating the decomposition of the electrolyte solution and the electrode. From the above data and in consideration of the stability of the activated carbon electrode, it may be judged that a polarization voltage range of up to 2.5 V could be acceptable for a stationary charge-discharge region for the electrode, and based on the specific surface area value thereof, the electric capacity of the electrode per the unit surface area at a polarization potential 2.5 V was computed, and it was 0.017 F/m².

The above confirmed the realizations of increased electric capacity, increased energy density and increased withstand voltage of the electrochemical capacitor of the present invention.

The invention claimed is:

1. An electrochemical capacitor comprising a nonaqueous electrolyte and a pair of electrodes, wherein
    carbon nanotubes are used as an electrode material for at least one electrode from the pair of electrodes,
    the carbon nanotubes have a specific surface area of from 1000 to 2500 m²/g and contain semiconductive carbon nanotubes,
    the electrode material exhibits a potential-dependant differential capacity due to electrochemical doping, and
    a differential capacity ratio ($C_{0.5}/C_0$) of the electrode material is at least 1.2, where $C_0$ is a differential capacity per the electrode weight (F/g) at a zero charge potential $E_0$, and $C_{0.5}$ is the differential capacity per the electrode weight (F/g) at a potential polarized by 0.5 V from the zero charge potential.

2. The electrochemical capacitor as claimed in claim 1, wherein the differential capacity ratio of the electrode material, $C_{0.5}/C_0$ is at least 1.8.

3. An electrode material for electrochemical capacitors comprising carbon nanotubes having a specific surface area of from 1000 to 2500 m²/g and containing semiconductive carbon nanotubes, wherein
    the electrode material exhibits a potential-dependent differential capacity due to electrochemical doping, and
    the electrode material has a differential capacity ratio ($C_{0.5}/C_0$), of at least 1.2, where $C_0$ is a differential capacity per the electrode weight (F/g) at a zero charge potential $E_0$, and $C_{0.5}$ is the differential capacity per the electrode weight (F/g) at a potential polarized by 0.5 V from the zero charge potential.

4. The electrode material for electrochemical capacitors as claimed in claim 3, wherein the differential capacity ratio of the electrode material, $C_{0.5}/C_0$ is at least 1.8.

* * * * *